Patented May 9, 1939

2,157,696

UNITED STATES PATENT OFFICE 2,157,696

MANUFACTURE OF FORMED BITUMINOUS BODIES

Harold W. Greider and Henri Marc, Wyoming, Ohio, assignors to The Philip Carey Manufacturing Company, a corporation of Ohio No Drawing. Original application April 14, 1933, Serial No. 666,126. Divided and this application November 19, 1934, Serial No. 753,646

4 Claims. (Cl. 18—47.5)

This invention relates to asphalt planks and other similar formed bituminous bodies and process of making the same. It relates particularly to the manufacture of bituminous bodies such as planks which are reinforced with filler material and which are designed for purposes such as industrial flooring, road surfacing, and wear-resisting surfaces for bridge lanes, platforms and the like. While this invention relates to bituminous bodies generally, such bodies will be referred to herein for the purpose of convenience in description as planks. This application is a division with respect to our copending application Ser. No. 666,126, filed April 14, 1933.

Bituminous planks are liable to be subjected to extreme conditions. When such planking is used as a wearing surface for bridges, roads and the like, it is subjected to heavy stresses applied by the wheels of heavy vehicles. Frequently road surfaces become heated by the sun to temperatures such as 135° F. At such temperatures bituminous planking should not soften unduly so as to be excessively deformed by traffic. On the other hand, the planking in winter is subjected to very low temperatures and under such conditions should not become unduly brittle. If the planks are to be nailed to a foundation in winter, the planks should not be so brittle as to crack and break. The planks also should be tough and strong.

It is a purpose of this invention to afford a bituminous plank which will successfully withstand severe and extreme conditions under widely varying temperature conditions and which has superior properties in every respect. It is a further purpose of this invention to afford a bituminous plank which will be hard and tough in high degree at ordinary or summer temperature and which is not excessively brittle when cold. It is a further purpose of this invention to accomplish the above ends without materially increasing the cost or weight of the plank.

Features of this invention relate to certain improvements developed by research in the compounding of bituminous materials and fillers. The materials used and the manner of their composition will be described in detail hereinbelow so that the practice of this invention will be made apparent.

One of the factors which contributes to the success of planks embodying this invention relates to effecting an increase in the softening point of the bitumen in the plank without correspondingly raising the point at which the bitumen becomes brittle. Thus to the bituminous material employed in making plank, there is added and distributed therethrough a substantial quantity of very finely-divided solid material in the form of a flour. It is one of the features of this invention to use a flour of such fineness of particle size and in such amounts as to substantially increase the softening point of the bituminous material with which the flour is mixed. While this invention is not to be limited by the correctness of any theory or theories advanced herein, it is believed that a flour of effective fineness used in effective quantity exercises an effect upon the bituminous material of an interfacial colloidal nature which modifies the normal characteristics of the bituminous material. In any event, the resulting plank is greatly improved. The temperature range between which the bituminous material has a particular brittleness (when cold) and has a particular softness (when warm) is substantially increased by the presence of the dispersed flour. Thus a plank is afforded which, while not excessively brittle in winter temperatures, is likewise resistant to deformation at summer temperatures.

In the manufacture of the new plank of this invention, its properties are affected and further improved by the employment of suitable proportions of coarse granular material in combination with the very fine flour as the coarse material tends to increase the resistance of the manufactured plank to flowing under pressure.

The incorporation of fiber in the plank is desirable in that its presence tends to increase the resistance of the plank to impact and compression-shear. In the manufacture of planks, fibrous ingredients (and asphalt as well) may be supplied from various scrap materials containing felt impregnated with bitumen, e. g., roofing scrap. However, while such materials can be used in the practice of this invention, decidedly improved results are attained by making up the plank with dry fibrous materials such as dry fiberized cotton or dry fiberized rag felt in at least major proportion and preferably substantially entirely from such dry material.

In order that the improvements afforded by the present invention may be the better recognized and appreciated, certain tests will now be described which are indicative of the ability of a bituminous plank to withstand the varying conditions encountered in use.

An important test is the compression-shear test. In this test a piece of the plank substantially six inches square is placed upon a flat platen and is subjected to pressure on the upper surface with a flat faced loading tool of steel substantially two inches square. A definite load is applied which is increased by definite increments at definite intervals of time. The test is conducted at any desired temperature. Temperatures of 77° F. and 135° F. have been adopted herein as being indicative of the resistance of the plank to compression-shear at ordinary temperatures, and at summer temperatures under the heat of the sun, respectively. The depth of penetration (deformation) for given loads and at given times indicates the ability of the plank to resist deformation by compression loads. The test should be met satisfactorily as failure to satisfactorily meet the test indicates that the plank will become excessively soft and deformable at ordinary or summer sun temperatures.

A bituminous plank should not only satisfactorily stand up under the compression-shear test but also should successfully pass the cold brittleness test to be described. In the test of cold brittleness a piece of plank is selected which is about 6" square and a 30 penny nail is driven straight through the plank with workmanlike blows at a corner of the block and at a distance of 1½" from both the end and side. The test is made after the block has been cooled uniformly to any desired low temperature. The tests referred to herein were made at 32° F. The block should not crack or break. If it does crack or break, it does not pass the cold brittleness test and failure in this regard is indicative of excessive brittleness of the plank when cold. The cold brittleness is also referred to herein as the cold nailing test.

The toughness of the plank is tested by determining the resistance of the plank to impact. To this end a piece of plank substantially 6" square is clamped firmly between the faces or jaws of a clamp, the faces of the clamp covering only 1½" of the piece selected for the test, leaving 4½" of the plank (6" in width) projecting from the clamp. The piece of plank is placed in the path of a swinging hammer having a face 1½" across and at least as wide as the width of the plank. The plank will therefore be subjected to a blow over an area 1½" by the width of the plank, and this area in the test is caused to be 1½" from the edge of the jaws of the clamp. The piece of plank is placed vertically and substantially vertically below the axis of rotation of the hammer. The hammer is started from a predetermined height so that the hammer will have a predetermined number of foot pounds of kinetic energy imparted to it when it strikes the block. If the block breaks, a certain number of foot pounds of kinetic energy will be absorbed. This can be determined by a scale upon which there can be observed the travel of the hammer after the block has been broken. The scale can be calibrated so as to give directly the foot pounds of energy required to break the plank under such conditions. If planks of different thickness or width are used, the data obtained can be reduced by calculation to give the result which would have been obtained if a piece of selected standard dimensions had been used, e. g., a plank 6" in width and 1" in thickness. The test can be made at any desired temperature, such as, for example, 77° F. The tests hereinafter referred to were conducted at 77° F. The result is referred to herein as the impact value.

The above described tests indicate with reasonable accuracy how the plank will stand up under varying conditions of use.

In order to give an illustration of a plank embodying this invention, the following analysis of a specimen plank will be given.

| Material | Percentage | Particulars |
|---|---|---|
| Asphalt | 40.6 | Melting point 180° F., penetration 10. |
| Waste cotton | 15.6 | About ½" fiber. |
| Slate flour | 21.9 | 95% through 325 mesh screen. |
| Slate dust | 12.5 | 90% on 140 mesh screen and 100% through 40 mesh screen. |
| Slate granules | 9.4 | 90% on 40 mesh screen and 100% through 20 mesh screen. |

The plank, analysis of which is given above, was subjected to the tests above described and was found to have the following properties, the plank being 6" wide and 1" thick.

Impact value (foot pounds per inch thickness of 6" plank) _____ 58
Nailing test at 32° F. _____ 100%
Compression-shear at 77° F. (50 lbs. per square inch per minute increase; deflection at 1000 lbs. per sq. inch in thousands) _____ 180
Compression-shear at 135° F. (50 lbs. per sq. inch per minute increase; deflection at 350 lbs. per sq. inch in thousands) ___ 150

The tests evidence that the specimen plank was tough (had a high impact value), very satisfactorily withstood the compression-shear tests at 77° F. and at 135° F., and passed the cold nailing test satisfactorily.

In addition to the above properties, the plank also has very satisfactory surface hardness. Liability of formed plank to shrinkage is also lessened. A further advantage of the new plank is that it does not tear excessively at nails with which the plank is secured. Trouble has been experienced heretofore, in that plank nailed to a foundation pulls at the nails under continued traffic, opening large tears or holes therein. Due to the increased toughness and solidity of the new plank, this difficulty is greatly lessened. The new plank also has very low water absorptive properties, e. g., less than 1%.

In order that the advantages of this invention may be fully realized, the following is a discussion as to materials used and their compounding and as to certain principles involved in the practice of this invention.

The bituminous material used in the plank should be reasonably hard at ordinary temperature but should fuse relatively easily so that it will coat the fiber and mineral filler at the temperatures employed in mixing, for example, at about 350° F. It is usually preferable to employ an asphaltic material, although any bituminous materials such as asphalt, pitch, tars, and the like may be used. It is usually preferable to use a bituminous material having a melting point of from about 165° F. to about 185° F. (by the so-called Ball and Ring method) and a penetration of from about 15 to 3 (Dow penetrometer, 100 g., 5 seconds, at 77° F. in hundredths of centimeter), although advantages of this invention are likewise afforded by using an asphalt having a melting point of from about 150° F. to about 235° F. and a penetration of from about 40 to about 3. In practice it has been found that it is preferable to use about 35% to 50% of asphalt in the plank although reasonably satisfactory and improved results are likewise afforded by using about 25% to about 55% asphalt.

As to the filler material (as distinguished from fiber), it is one of the features of this invention that a substantial proportion be, as hereinabove stated, in an extremely finely-divided state. This extremely finely-divided filler or "flour", as it is called herein, may be any sufficiently finely-divided solid material, as it is particle size rather than chemical composition which is of importance. Thus slate flour, limestone flour, talc, fine silica dust or flour, etc., give very satisfactory results. While inorganic mineral flours are preferable, organic flour such as wood flour may be used. However, wood flour is open to the objection for some uses of the plank that it tends to absorb moisture and does not produce as strong a plank as the inorganic flours. It is preferable to use a flour which is so fine that about 90% will pass a 325 mesh screen. It is also preferable to use the flour in amounts such as about 20% to about 40% on the weight of the plank, although amounts such as about 15% to about 45% give satisfactory results. And in proportion to the amount of bitumen, about 30% to about 100% of flour on the weight of the bitumen may advantageously be used, about 50% to 80% ordinarily being preferable when a very fine flour is used. The presence of the fine material appears to raise the softening point of the asphalt. Thus when asphalts are used such as above described which are not excessively brittle when cold (e. g., at 32° F.), the asphalt is affected by the flour dispersed therein so as to have increased resistance to compression-shear at temperatures such as 77° F. or 135° F. The increase of the resistance of the plank to compression-shear loads at ordinary and summer sun temperatures is associated with a definite and substantial increase in the softening point of the bitumen, and an increase is afforded between a particular degree of brittleness (as determinable by the cold nailing test, for example) and a particular degree of softness (as determined by the compression-shear test, for example). It is preferable to have the flour as fine as possible, as the finer the flour is the less has to be used. If very large amounts of flour are used, the plank is made more hard and more brittle and heavier. It is preferable to keep the weight down and secure maximum toughness by using a very fine flour. The fine material (flour) should be substantially insoluble in and unreactive with water and asphalt (particularly the lighter fractions) and should preferably be of strong structure. In the latter connection, structurally weak, friable or porous materials, such as coke, rotten stone, granulated slag, pumice, etc., do not give as strong a plank as when structurally strong material is used. The flour should also have low water-absorptive properties, especially when the plank is to be subjected to the elements.

While specific figures have been given of preferred fineness of subdivision and preferred amounts of fine material, this has been done for the guidance of persons who may wish to practice this invention and obtain the advantages thereof in relatively high degree. However, it is possible to secure the advantages of this invention in part, in accordance with the principles herein disclosed, even though there is departure from specific figures, which are, it is to be understood, merely mentioned for the purpose of illustration and description.

While it is possible to practice this invention using only a fine flour as a filler, it is preferable to combine the flour with a substantial quantity of a coarser material. The presence of coarser material facilitates the incorporation of the fine material and makes the plank somewhat less brittle. Moreover, the presence of the coarse material gives increased resistance to abrasion and facilitates the extrusion of the material from an extrusion die. For coarse material, any convenient and economical source of such material can be used, such as slate granules, ground asbestos cement shingles, ground asbestos mill board, short asbestos fiber, by-product inorganic granules, etc. The size of the coarse material is larger than that of the flour and preferably ranges from a material which will pass a 20-mesh screen to material which will pass a 200 mesh screen. Preferably about 20% to about 30% of the coarse material on the weight of the plank is used and preferably also the particles should contain some relatively coarse material (e. g., passing a 20 mesh screen, but retained in a 40 mesh screen) and some finer material (e. g., retained on a 140 mesh screen but passing a 40 mesh screen). The coarse filler may be considered to function as a "graded aggregate" in the bituminous matrix. Proportions such as about 10% to about 35% of the coarse material on the weight of the plank also gives satisfactory results. The coarse material should be insoluble in water and asphalt, and should be structurally strong. Preferably inorganic materials are used.

The ratio of the fine material (flour) to coarse material may vary considerably and may be, for example, from a ratio of about 4 of fine material to about 1 of coarse material to a ratio of about 1 of fine material to about 2 of coarse material. Preferably proportions ranging from a ratio of about 3 of fine material to about 1 of coarse material to about equal proportions are used.

With regard to both the coarse and the fine material (flour), it is preferable to use those materials which tend to strongly adhere to the bituminous bonding material. For example, slate dust and limestone dust are preferable in this regard for the fine material, and slate granules, ground asbestos cement shingle scrap and the like are preferable for the coarse material.

The fibrous materials which may be advantageously employed are varied. For both economy and serviceability, cellulose fiber, including vegetable fibers such as fiberized waste cotton, dry felt scrap, jute, manila, #2 roofing rags, etc., are preferable. Ordinary fiber felt consisting of a mixture of fibers in a distended loose state made from a variety of sources may also be used to advantage and such mixture will be referred to herein as "dry felt". Asbestos fiber such as qualities known in the art as 2X or 3X may be used to secure a strong, tough plank but asbestos is at the present time more expensive than vegetable fiber and produces a heavier plank. Wool and other animal hairs may be used but do not produce a product which is as strong as plank made from cellulose fiber (e. g., waste cotton). The use of about 5% to 25% of fiber gives satisfactory results though the use of about 10% to 20% is ordinarily preferable. In this connection, greater quantities of fiber are difficult to distribute uniformly with elimination of weak points in the finished plank. The use of about ⅛" to about ⅜" fiber is ordinarily preferable, although there is considerable latitude in this regard and, for example, about 1/16" to about ½" fibers may be used.

As hereinabove stated, it is preferable to employ dry fiber and mix it with the bituminous bonding material directly. Heretofore waste scrap from roofing and like materials has been used. When such materials are used, the saturant in the fiber is never properly replaced by proper bituminous bonding base, and the melting point of the saturant for the fiber in the finished plank is considerably lower than the melting point of the bituminous bonding material. The result is that the plank is of decreased toughness and resistance to compression shear and is of increased brittleness. A tougher and less brittle plank is afforded by having the melting point of the saturant for the fiber substantially the same as the melting point of bituminous bonding material of the plank or within the range which is desirable as a bituminous bonding material for the plank. Moreover, it is difficult to disintegrate masses of bitumen impregnated fiber so as to properly distribute the fiber in a substantially fiberized or free state substantially uniformly through the bonding bituminous material. While it is preferable to use dry fiber in the mixing of the plank, some of the advantages of this invention may be achieved by using saturated fiber which is saturated with a bituminous composition which has substantially as high a melting point as the bitumen used in the finished plank as a whole or is within the range which is desirable for bituminous bonding material for the finished plank. While it is preferable to use dry fiber or fiber saturated with bituminous material of similar characteristics to that used in the body of the plank, other features of this invention can be practiced even though roofing scrap and the like is used as a source of fibrous material. Moreover, part dry fiber and part saturated fiber from roofing scrap, for example, can be employed in the practice of this invention, but it has been found that as the proportion of roofing scrap is increased, the toughness of the plank progressively decreases, and that more than about 25% of roofing scrap gives a considerably less tough and more brittle product. In this connection, the closer the melting point of the bitumen in the scrap material approaches the melting point of the bitumen in the body of the plank, the more scrap material can be used without excessively impairing the properties of the manufactured plank. Ordinarily, however, it is preferable to use less than 40% of scrap material, as the employment of greater amounts causes to be included in the mix excessive quantities of fiber, for example, contained in the scrap.

In the manufacture of improved plank embodying this invention, it is desirable to substantially uniformly distribute the fine flour, the coarse filler, and the fiber throughout the bituminous bonding material. For convenience and economy of manufacture, the ingredients are preferably mixed while the asphalt is hot, and then, while the mixture is plastic, it is forced through an extrusion die having the desired sectional dimensions. The extruded material can then be cut into desired lengths.

The mixing of the materials may be accomplished in any suitable manner. Preferably a heated mixer, e. g., steam jacketed, is used. Fibrous material is first mixed with hot bitumen. Any dry felt is first preferably fiberized to a light, extended mass wherein the individual fibers are as free as possible of each other before admixture with the bitumen. The felt is preferably added dry, that is, substantially free of bituminous saturants, for reasons hereinabove stated, and when plank is referred to as containing dry fiber it will be understood that the fiber in the plank has been added dry in this sense. If saturated felt is added, e. g., roofing scrap, it is added in relatively small pieces to the hot bitumen and attempt is made to fiberize the pieces as much as possible. All of the ingredients are preferably added in predetermined measured quantities. The mixing is continued until the fiber is distributed in a saturated condition throughout the bitumen. The fine flour is next added and the mixing is continued until it is coated. The coarse material is then added, but the mixing is continued only for a relatively short time, i. e., until the mass forms irregular balls or lumps of material about ¼" to 5 inches in diameter coated with the coarse material. The lumps thus formed can be conveniently handled and passed to the extruder. In the extruder, the lumps of material are forced to and through an extrusion orifice by suitable means such as a screw conveyor, and in this phase of the process the mixing of the materials is completed so that the coarse filler as well as the fine filler and fiber is thoroughly coated and distributed through the extruded plank.

In order to obtain a plank having improved impact strength, the above procedure can be modified by first incorporating the fine material with the hot bitumen. The addition of the fine flour tends to stiffen the bitumen so that the fiber subsequently is more powerfully acted upon by the mixer and is more uniformly distributed. The addition of the coarse material and the forming of the plank by forcing the mix through an extrusion die can then be accomplished as above described.

In mixing the mass, the asphalt is preferably introduced at a temperature which is high enough to render the asphalt of sufficient fluidity to permit the thorough coating of the filler material and the filler material is distributed substantially uniformly throughout the mass. On the other hand, too great fluidity should be avoided, as uniform mixing of the materials is rendered more difficult and excessively high temperatures are likely to burn and weaken the fiber. The asphalt may be used at a temperature of from about 300° F. to about 400° F. and is preferably used at a temperature of from about 325° F. to about 375° F. The fiber and mineral may be added cold and it is preferable to so do, as the slightly increased stiffness imparted to the mass thereby is favorable to thorough coating of the material. The material usually cools down during the mixing operations and in passing the material to the extruder, to from about 125° F. to about 200° F. and is preferably passed to the extruder at a temperature of from about 150° F. to about 175° F. In the extruder, the material is brought to a temperature which is favorable to the extrusion of the type of plank being manufactured and is ordinarily heated so that it passes through the extrusion orifice at about 200° F. to 300° F. To this end, the orifice itself may be heated as by steam jacketing and to a temperature slightly higher than the temperature of the material passing therethrough, e. g., to about 275° F. to 350° F. so that material will pass through the die leaving a smooth surface. For planks about six inches wide and about ½ to 1½ inches in thickness, the temperature of the extruded material may be preferably maintained at about 225° F. to about 275° F. and the extrusion die itself may be preferably heated to about 300° F. to about 325° F.

While this invention has been described in connection with numerous specific illustrations, it is to be understood that this has been done merely for the purpose of illustrating the practice of this invention, and that the scope of this invention is not to be limited thereby.

It is also to be understood that when reference is made in the specification and in the claims to "planks" that this word is to be regarded as including any formed bodies containing bituminous material of the nature of boards, blocks, filler units, and the like.

We claim:

1. A process of manufacturing bituminous plank containing bituminous material, fiber, and filler which comprises mixing the fiber and a part of the filler with the bituminous material in a heated condition, until substantially complete coating is effected, then adding the remainder of the filler and mixing the mass only until the mass separates into balls separated by a dust-like coating of the incompletely coated last added filler, and then forcing the mass while plastic through an extrusion die by means of pressure, the coating of the last added filler being completed during the extrusion operation wherein the mass is forced to and through the extrusion die.

2. A process of manufacturing bituminous plank containing bituminous material, fiber, and filler which comprises mixing the fiber and a part of the filler with the bituminous material in a heated condition, until substantially complete coating is effected, then adding the remainder of the filler and mixing the mass only until the mass separates into balls separated by a dust-like coating of the incompletely coated last added filler, and then forcing the mass while plastic through an extrusion die by means of pressure, the coating of the last added filler being completed during the extrusion operation wherein the mass is forced to and through the extrusion die, and said filler including a fine inorganic flour which is sufficiently finely divided and is present in sufficient amount to substantially elevate the softening point of the bituminous material.

3. A process of manufacturing bituminous plank containing bituminous material, fiber, and filler which comprises mixing the fiber and filler with the bituminous material while the bituminous material is in a heated condition and forcing said mixture while it is in a plastic condition through an extrusion die having the internal surface area of the portion of the die that imparts the ultimate cross-sectional dimensions to the formed mass extruded from said die maintained at a temperature about 40° F. to about 200° F. higher than the melting point of the bituminous material in said mixture forced through said die in contact with said surface area.

4. A process of manufacturing bituminous plank containing bituminous material, fiber, and filler which comprises mixing the fiber, and filler with the bituminous material while the bituminous material is in a heated condition and forcing the mixture while it is in a plastic condition through an extrusion die, the surfaces of the extrusion die which impart the ultimate cross-sectional dimensions to the formed mass extruded from said die being maintained at a temperature about 90° F. to about 200° F. higher than the melting point of the bituminous material in said mixture forced through the extrusion die in contact with said surfaces.

HAROLD W. GREIDER.
HENRI MARC.